(12) United States Patent
Feldman et al.

(10) Patent No.: US 10,959,040 B2
(45) Date of Patent: *Mar. 23, 2021

(54) VENUE AND EVENT RECOMMENDATIONS FOR A USER OF A PORTABLE MEDIA PLAYER DEVICE

(71) Applicant: VARIA HOLDINGS LLC, Brooklyn, NY (US)

(72) Inventors: Evan Feldman, Woodinville, WA (US); Jonathan Nelson, Seattle, WA (US)

(73) Assignee: VARIA HOLDINGS LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,089

(22) Filed: Feb. 13, 2019

(65) Prior Publication Data

US 2019/0253832 A1 Aug. 15, 2019

Related U.S. Application Data

(63) Continuation of application No. 14/860,339, filed on Sep. 21, 2015, now Pat. No. 10,251,021, which is a
(Continued)

(51) Int. Cl.
*G06F 21/00* (2013.01)
*H04W 4/021* (2018.01)
(Continued)

(52) U.S. Cl.
CPC ........ *H04W 4/021* (2013.01); *G06F 16/9535* (2019.01); *G06Q 30/02* (2013.01); *H04W 4/029* (2018.02)

(58) Field of Classification Search
CPC ... H04W 4/021; H04W 4/029; G06F 16/9535; G06Q 30/02; G06Q 30/0267; G06Q 10/02; G06Q 30/0261
See application file for complete search history.

(56) References Cited

U.S. PATENT DOCUMENTS 7,310,532 B2 * 12/2007 Knauerhase .......... H04W 4/029
455/456.1
8,611,920 B2 12/2013 Lau et al.
(Continued)

OTHER PUBLICATIONS

Office Action dated Jun. 16, 2010 for U.S. Appl. No. 12/144,532, 12 pages.
(Continued)

*Primary Examiner* — Alexander Lagor
(74) *Attorney, Agent, or Firm* — Schwabe, Williamson & Wyatt, P.C.

(57) ABSTRACT

A method and system for generating by a server, a recommendation for a venue or an event of interest proximally located to an inferred current location of a user of a portable media player device. In an embodiment, a server may determine one or more media preferences for a user based at least in part on media stored on or accessed using the portable media player device of the user. The server may generate information related to the current location or a recommendation for a venue or an event of interest to the user based at least in part on the one or more media preferences and the inferred current location of the user. Once generated, the server then may communicate the recommendation (or the information) to the user, e.g. the portable media player device. Other embodiments may also be described and claimed.

20 Claims, 4 Drawing Sheets

Related U.S. Application Data continuation of application No. 12/144,532, filed on Jun. 23, 2008, now Pat. No. 9,141,960.

(60) Provisional application No. 60/945,677, filed on Jun. 22, 2007.

(51) Int. Cl.
*G06F 16/9535* (2019.01)
*H04W 4/029* (2018.01)
*G06Q 30/02* (2012.01)

(56) References Cited

U.S. PATENT DOCUMENTS

| | | |
|---|---|---|
| 2002/0055926 A1 | 5/2002 | Dan et al. |
| 2004/0023666 A1 | 2/2004 | Moon et al. |
| 2005/0181776 A1 | 8/2005 | Verma et al. |
| 2006/0123080 A1* | 6/2006 | Baudino ............... H04L 67/306 709/204 |
| 2007/0078884 A1 | 4/2007 | Ott, IV et al. |
| 2007/0155307 A1 | 7/2007 | Ng et al. |
| 2008/0154696 A1* | 6/2008 | Spiegelman ........... G06Q 30/02 705/7.32 |
| 2008/0248740 A1 | 10/2008 | Lazovsky et al. |
| 2009/0222392 A1 | 9/2009 | Martin et al. |

OTHER PUBLICATIONS

Final Office Action dated Nov. 10, 2010 for U.S. Appl. No. 12/144,532, 17 pages.
Office Action dated Mar. 2, 2011 for U.S. Appl. No. 12/144,532, 15 pages.
Office Action dated Apr. 19, 2017 for U.S. Appl. No. 14/860,339, 12 pages.
Office Action dated Oct. 6, 2017 for U.S. Appl. No. 14/860,339, 20 pages.
Final Office Action dated Feb. 16, 2018 for U.S. Appl. No. 14/860,339, 20 pages.
Office Action dated Jun. 4, 2018 for U.S. Appl. No. 14/860,339, 17 pages.

* cited by examiner

VENUE AND EVENT RECOMMENDATIONS FOR A USER OF A PORTABLE MEDIA PLAYER DEVICE

RELATED APPLICATIONS

The present application is a continuation of U.S. patent application Ser. No. 14/860,339, filed Sep. 21, 2015, which is a continuation of U.S. patent application Ser. No. 12/144, 532, filed Jun. 23, 2008, now U.S. Pat. No. 9,141,960, which claims the benefit of priority from and is related to commonly-owned U.S. Provisional Application No. 60/945,677 filed Jun. 22, 2007. The disclosures of the foregoing applications are hereby incorporated by reference in their entireties, including any appendices or attachments thereof, for all purposes.

TECHNICAL FIELD

The present invention relates to the field of portable media player devices. More specifically, the present invention relates to venue or event recommendations for a user of a portable media player device.

BACKGROUND

Portable media player devices are increasing in popularity. A portable media player device is a transportable device that plays one or more media file types, including text, audio, video, graphics, interactive, and other media file types. Portable media player devices are usually handheld devices (also referred to as palm-sized device) capable of displaying and/or playing media files. The hardware and/or software components embodied in the device for the displaying and playing of media files are collectively referred to as a "media player," a "mobile device," and/or the like. Examples of portable media player devices include the iPod available from Apple Computer of Cupertino, Calif.; the Zune available from Microsoft Corporation of Redmond, Wash.; the Ibiza™ Rhapsody® from Varia Mobil of Seattle, Wash., and other like devices. For purposes of this disclosure, a portable media player device may include devices specifically tailored to play media, or could include laptop computers, smartphones, tablet computers, wearable devices, in-vehicle computing systems (e.g., a dash mounted devices, infortainment system, and/or the like).

Media may be stored on a portable media player device (e.g., by downloading media such as music to the portable media player device), accessed via a portable media player device from a network site (e.g., by streaming from a network site), or acquired by a user via a portable media player device in one or more ways (e.g., by the purchase and installation of a flash memory card containing media). With the advance of storage technology, the amount of media that can be stored in a portable media player device has grown exponentially. Couple that with the advance of telecommunications and networking technology, the number of sites offering media and other media-rich environments to provide new and/or replacement media content for portable media player devices have also grown exponentially. As a result, portable media player devices are increasingly "connected", and users almost never travel (leave home) without their personal portable media player devices.

BRIEF DESCRIPTION OF DRAWINGS

The present invention is illustrated by way of example and not by way of limitation in the figures of the accompanying drawings, in which like references indicate similar elements and in which.

DETAILED DESCRIPTION

Figure 1:
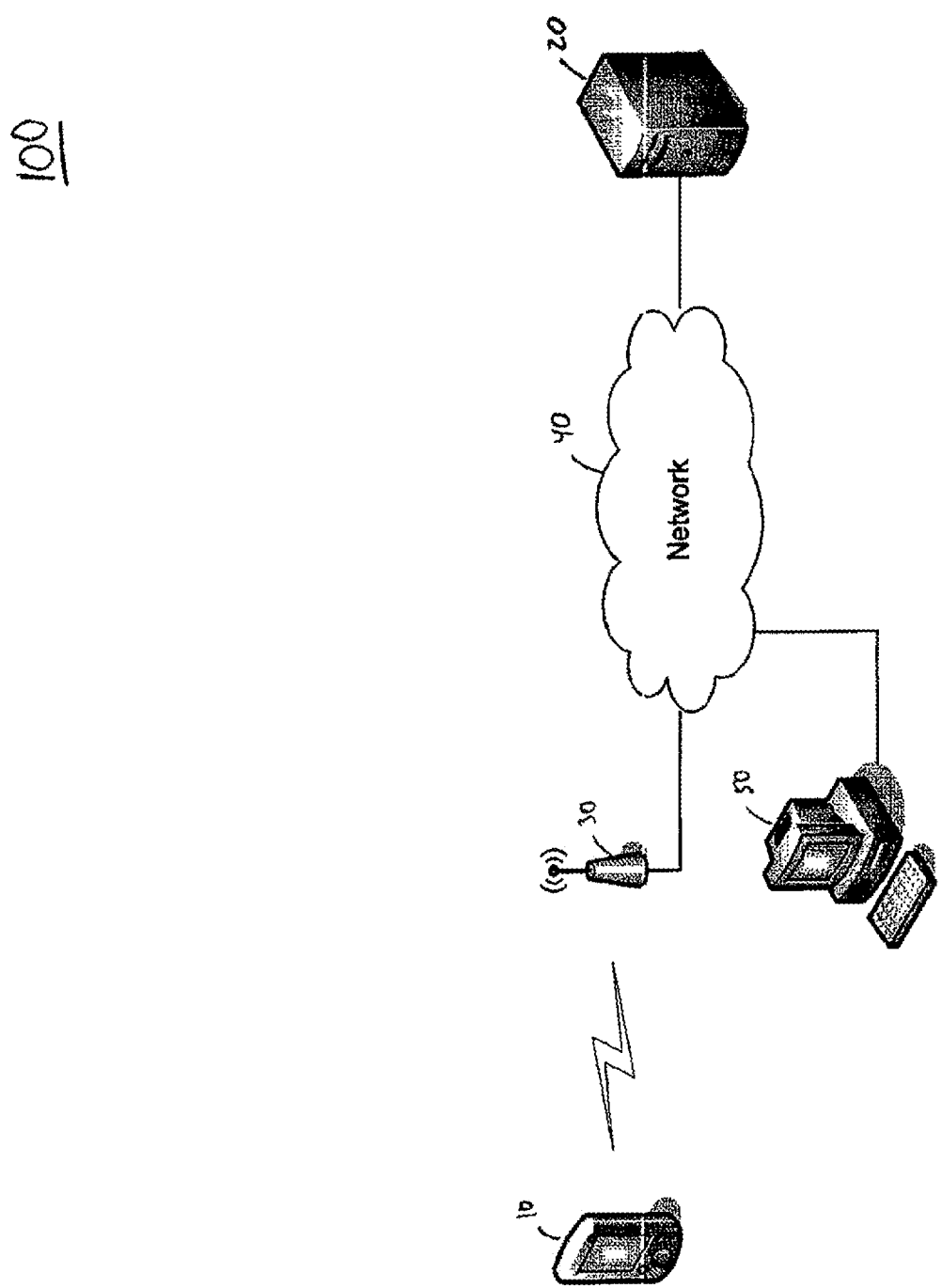
FIG. 1 illustrates a representative environment in which an embodiment of the invention is implemented.

In the following detailed description of exemplary embodiments of the invention, reference is made to the accompanying drawings, which form a part hereof, and which show, by way of illustration, specific exemplary embodiments by which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Various operations will be described as multiple discrete operations. In turn, in a manner that is most helpful in understanding the present invention, however, the order of description should not be construed as to imply that these operations are necessarily order dependent. In particular, these operations need not be performed in the order of presentation.

Furthermore, reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A method and system for providing venue and/or event recommendations for a user of a portable media player device, thereby further increasing the user experience of the user of the portable media player device, is described. In various embodiments, the venue and/or event recommendations are for venues and/or events of potential interest to the user at locations proximally located to an inferred current location of the user, based at least in part on an inferred entertainment interest of the user. In various embodiments, the current location of the user is inferred based at least in part on current and/or recent geographic locations of the portable media player device, and the entertainment interest is inferred based at least in part on the media files or content stored in and/or accessed using the portable media player device. In various embodiments, the recommendations are provided to the users' portable media player devices.

Thus, in various embodiments, a user of a portable media player device having media of a particular genre stored on or accessed using the portable media player device may receive a recommendation for a venue or event that is related to that particular genre and is proximally located to the inferred current location of the user of the portable media player device. For example, a server may generate a recommendation for a nearby concert by an alternative rock band for a user of a portable media player device that has inferred interest in alterative rock, inferred based at least in part on media of an alternative rock or like genre stored on and/or accessed via his portable media player device. A recommendation may also be generated based in part upon interest inferred based at least in part image media stored in and/or accessed via the portable media player device. For example, images of a modern or related art painting stored in and/or accessed via the portable media player device may infer a particular interest in art and influence the server to generate a recommendation for a Pablo Picasso modern art exhibit presently at a modern art museum or gallery proximally located to the inferred current location of the user of the portable media player device.

Recommended venues or events may include a wide variety of proximally located venues or events of interest to a user. In various embodiments, a proximally located venue may include a place of worship or a place of historic or cultural significance proximally located to the portable media player device. A proximally held event may include a cultural, community or political event that might occur at one of the aforementioned venues or at another location. In these embodiments, the recommendation for the proximally located event or venue may be based upon a subject preference of the user determined by podcast media stored in and/or accessed via the portable media player device. For example, a user traveling in France with his portable media player device may have Baroque art podcasts stored on or accessed using his or her portable media player device. In an embodiment, when the user as e.g. inferred by the locations of the portable media player device are within a proximal location of a Baroque era church, the server may generate a recommendation for visiting the church. In various embodiments, the server may also provide the user with directions and details related to visiting the church. In other embodiments, the server may generate recommendations for proximally located events such as a political rally or speech that are consistent with political podcasts stored on or accessed using the portable media player device.

Note that in other embodiments, the server may generate not only recommendations for events or venues but also information and/or media recommendations proximally associated with a current location of a user of the portable media player device. For example, if media stored on or accessed using the portable media player device suggests that the user is a fan of Jazz music, the server may generate and provide information about Jazz artists who began their careers in the current city the user is in. Alternatively or additionally the server may also generate and provide a recommendation for one or more podcasts, books (audio or print), and/or websites about the jazz artists for the user of the portable media player device. As another example, when the user travels to a new state with the portable media player device, the server may generate and directly push information about the state such as the state history, the state government, the state flower and/or state song to the portable media player device.

Referring now to FIG. 1 which illustrates a representative environment 100 in which an embodiment of the invention may be implemented. In the embodiment shown, a portable media player device 10 having stored therein a number of media files ("media") is associated with a user. Additionally, computer 50 may be associated with portable media player device 10 and may or may not be located in proximity of portable media player device 10. In the illustrated embodiment, a server 20 may infer a current location of the user by determining a current location of the portable media player device 10 as well as receive and transmit information to and from portable media player device 10 (or other communication medium) via a wireless access point 30 and network 40. Other communication medium may include SMS or MMS messaging, email, facsimile, paging message and/or phone calls. Network 40 may include for example a Wide Area Network (WAN), Local Area Network (LAN) (e.g. Ethernet), an intranet, internet, a public switched telephone network (PSTN) as well as a wired or wireless communications network (e.g. WiFi), or combination thereof. In the representative environment 100, the server 20 may receive a current location or successively receive a series of current locations of a portable media player device 10 as well as media or information about media stored on or accessed using portable media player device 10, and in response, server 20 may transmit one or more recommendations for a venue or event, or information of interest to the user, e.g. to portable media player device 10, to be described more fully below.

Figure 2:
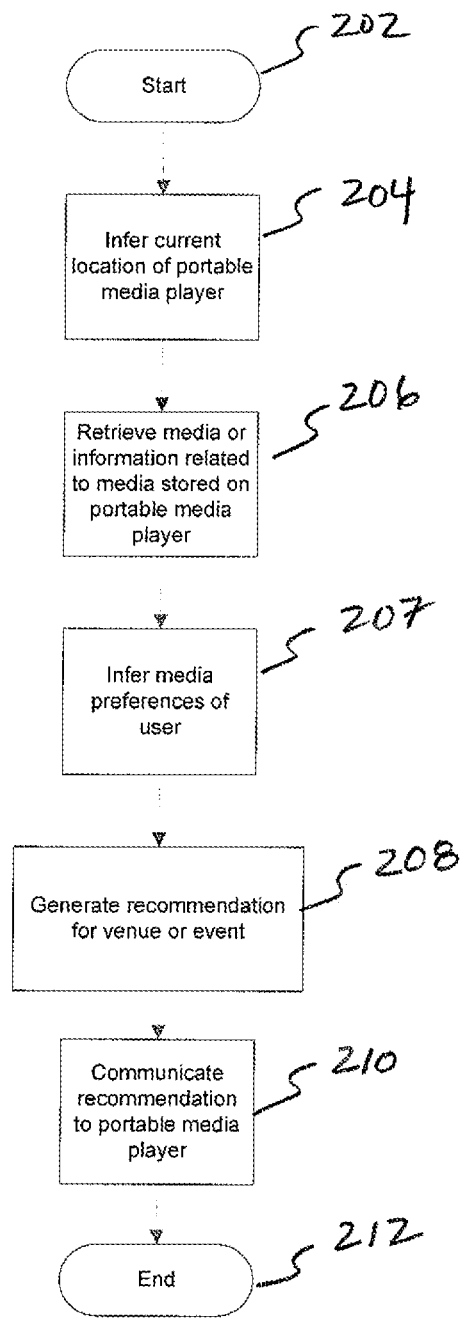
FIG. 2 is a flow chart illustrating an embodiment of the invention.

FIG. 2 is a flow chart 200 that illustrates a method of generating by a server a recommendation for a venue or event of interest proximally located to (or information about) a current location of a user of the portable media player device in accordance with various embodiments of the invention. In the embodiments shown, a recommendation (or information) is generated and provided based at least in part on an inferred current location of the user, and inferred entertainment interest of the user. In various embodiments, the current location of the user is inferred based at least in part on the user's portable media player device's actual geographic location (otherwise referred to as the current location of a portable media player device) and the user's entertainment interest is inferred based at least in part on media and/or information about the media stored in and/or accessed using the portable media player device. The recommendation for the venue or event (or information) of interest may then be communicated to user, e.g. to the portable media player device, or alternatively to another communication medium, such as SMS/MMS message, email, facsimile, paging and/or voice call.

The method begins at a block 204 where, in an embodiment, a server such as server 20 of FIG. 1 infers a current location of the user. The inference may include receiving or determining a current location (or successively receiving a series of locations) of a portable media player device associated with the user. Note that in various embodiments, the server can determine the current location of the portable media player device by using various methods. The server may estimate the current location of the portable media player device based on a location of a wireless access point through which the portable media player device establishes a network connection to the server. Or, the server may estimate the current location of the portable media player device based upon the results of triangulating signals from various signal towers or based upon the server's communication with other portable media player devices having known current locations. The server might also receive the current location of the portable media player device from a global positioning system (GPS) module located within the portable media player device.

In other embodiments, the current location may be manually entered by the user into the portable media player device or other communication devices (such as a mobile phone) for transmission to the server. For example, the user may enter a code of an airport where she recently landed or a name of a city in which she is currently visiting (for business or pleasure). The server may also allow the user to enter one or more preferred geographic locations for which the user would like to receive a recommendation or information. For example, the user may know that she will be traveling with the portable media player device to Denver the following week and may therefore desire to receive recommendations for events or venues in (or information about) the Denver area.

Returning to the method illustrated in flow chart 200, after the server infers a current location of the user in block 204, the server may infer an entertainment interest of the user at the next blocks 206/207. The inference may include retrieving media or information about media stored on and/or accessed using the user's portable media player device at a next block 206. This media or information about media stored on or accessed using the portable media player device may be retrieved by the server by various methods such as for example via network 40 and wireless access point 30 as described in conjunction with FIG. 1. Information about media stored on or accessed using the portable media player device may also be retrieved from storage within the server itself. For example, in various embodiments, the server may have such information stored at the server (or in other storage accessible to the server) as a result of previous syncing of media between the portable media player device and the server or as a result of previous browsing of media on the server by the user of the portable media player device. The information may be gathered and retrieved in real time, or continuously over a usage period.

At a next block 207, the server may determine one or more media preferences or interest for the user based in part upon the media and/or information about the media stored on or accessed using the portable media player device. In various embodiments, the server can analyze the media and the information about the media stored on or accessed using the portable media player device to identify user preferences for particular genres of media. Thus, in various embodiments, the server may analyze e.g. the meta data associated with a wide variety of media stored on or accessed using the portable media player device such as music, podcasts, books or audiobooks, video, photos or other images for various trends that can be translated into user preferences for a particular genre of music, film, video or art. The meta data may include data about the media title, media type, artist, subject matter, and so forth. For example, the server may determine that the user has a preference for a jazz music genre if the portable media player device stores or has been used to access a substantial amount of music by famous jazz artists such as Ella Fitzgerald or Louis Armstrong. What constitutes a substantial amount may be evolved dynamically overtime based on feedback on the relevance, success or usefulness of the recommendation and/or information provided to the user or a group of users. The server may also determine that the user has a preference for film genres related to science fiction if a significant number of science fiction movies such as Close Encounters of the Third Kind or Star Wars are stored as video media in or accessed using the portable media player device.

After one or more media preferences have been determined at block 207, the process then moves to a block 208. At block 208, the server may make a recommendation for a venue or event (or provide information) based at least in part on the inferred current location of the user and the determined media preference of the user of the portable media player device. In various embodiments, the server may generate the recommended venues/events (or information) using collaborative filtering, or other recommendation techniques that can take into account the media stored in or accessed using the user's portable media player device, other information about the user's media preferences, and venues or events proximally located (or that will occur in a proximate location) to the current location of the user of the portable media player device. In generating a recommendation for a venue or event (or information), the server may access databases or information from various sources or service providers, e.g., a ticket sales and distribution company or an local online entertainment city guide. For example, the server may compare a user's preference for a particular genre of music to a database that includes citywide events or venues that are hosting or typically host bands which play music of that particular genre. The server may collect the venue and/or event information in real time or the server may gather the information periodically.

Thus, the server may transmit a recommendation (or information) to a user, e.g. his portable music player device having jazz music stored on or accessed using the portable music player device for a club that plays live jazz or blues within a convenient walking or driving distance to the current location of the user and the portable media player device. The server may also transmit a recommendation (or information) to a user, e.g. his portable music player device having gospel music stored on or accessed using the portable music player device for a church known for gospel music within a convenient walking or driving distance to the current location of the user and the portable media player device. The server may also transmit another recommendation for a theatrical or cinematography event such as a nearby science fiction film festival to the user determined to have user preferences for a science fiction film genre.

After the server generates the recommendation (or information), the process moves to block 210 where the server may communicate the recommendation to the user by transmitting the recommendation (or information) to e.g. the portable media player device. In various embodiments, as alluded earlier, this may include transmitting the recommendation (or information) by sending either a short message service (SMS) message, an email message, a pager message or a facsimile message to the user or by placing a call to the user. In various embodiments, directions to the event, venue or other location of interest from the current location of the portable media player device can also be sent to the portable media player device (not shown). The process may end at a block 212.

Note that method 200 may be repeated. For example, if the user so desires, automatic recommendations (or information) may be pushed to the user on a periodic basis, or when the portable media player device detects that the user has changed a current geographic location. For example, a user arriving in Miami may find that the user's portable media player device has automatically received various recommended events or venues occurring in (or information about) Miami when the user arrives at the Miami airport.

Note also that in various embodiments, the server may perform the operations of method 200 in a different order than as presented in FIG. 2. For example, the server may infer user preferences at the time media is added to the portable media player device. The media and/or information about the media as well as inferred media preferences may remain relatively static until a later time when the server infers a proximal location of the portable media player device. Thus, in some embodiments, the operations of blocks 206 and 207 or variations thereof, may be performed prior to the operation of block 204.

In various embodiments, a user of the portable media player device may be a subscriber of the service provided by the server. In various embodiments, the cost of the service may be borne by the recommended venue and/or organizers of the events of interest, or combination thereof.

Figure 3:
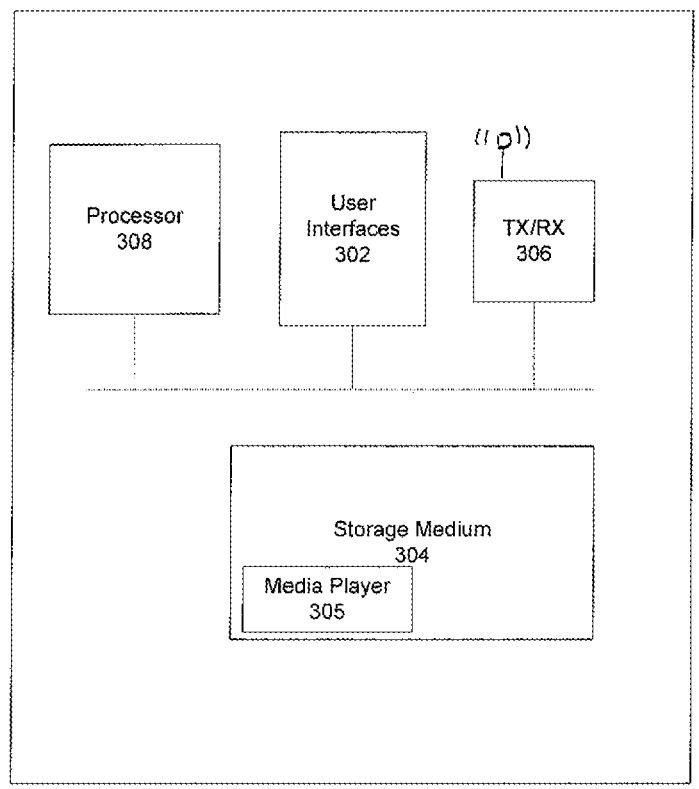
FIG. 3 illustrates an internal component view of a portable media player device in accordance with an embodiment of the invention.

FIG. 3 illustrates an internal component view of an example handheld portable media player device 300 in an embodiment of the invention. In the embodiment shown, a handheld portable media player device 300 includes a processor 308 coupled to user interfaces 302, storage medium 304 and transmitter/receiver (TX/RX) 306 ("transceiver"). The storage medium 304 includes instructions implementing a media player 305. In alternate embodiments, all or portions of the media player may be implemented in hardware, e.g. hardware components dedicated to encoding/decoding, compression/decompression, encryption/decryption, digital rights management, signal filtering or other processing. The transceiver 306 may be a radiofrequency (RF) transceiver that in various embodiments may support WiFi, WiMax or other wireless local area network access. In some embodiments, the RF transceiver may support EDGE (Enhanced Data GSM Environment) or G3 communication protocols.

In an embodiment, portable media player device 300 is configured to selectively play media and optionally, to provide a server with a current location of the portable media player device 300 via transceiver 306. The portable media player device 300 may be configured to receive in response, a recommendation for a venue or event of interest proximally located to (or information about) the current location of a portable media player device 300. The recommendation (or information) may be generated by the server based at least in part on an inferred current location of the user, and inferred entertainment interest of user, based e.g. on media stored in storage medium 304, and/or accessed using the portable media player device 300. In various embodiments, the user interfaces 302 may include a display, touch pad, touch screen and other input/output (I/O) devices or the like (not shown). In the embodiment, a display or touch screen of user interfaces 302 may be adapted to display the received recommendation.

Figure 4:
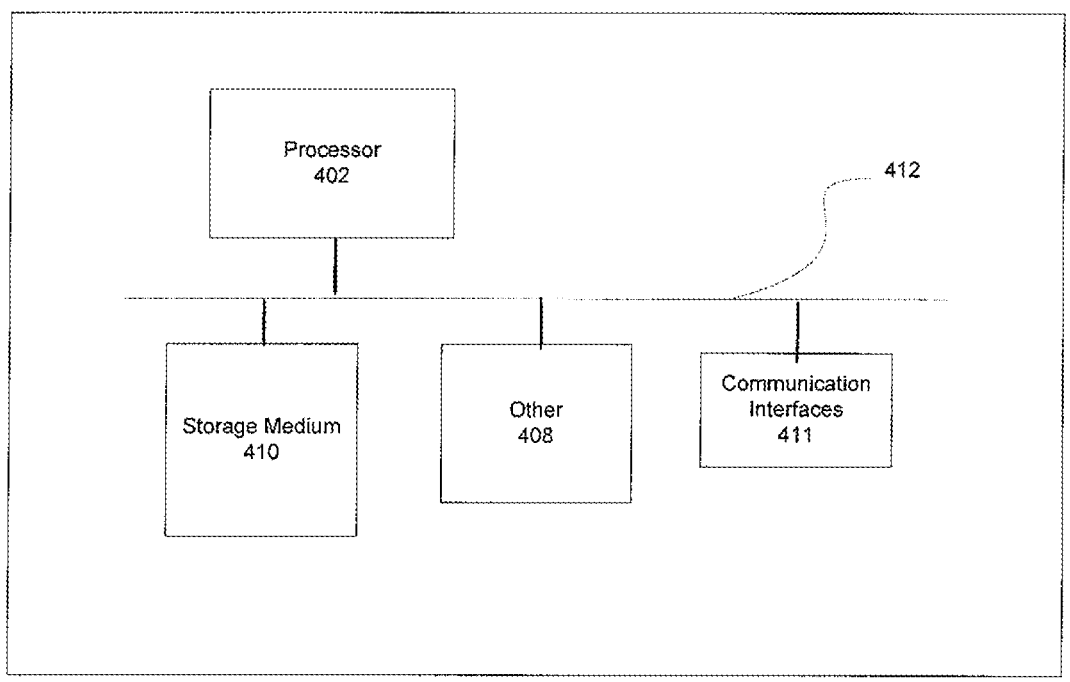
FIG. 4 illustrates an exemplary server apparatus, in accordance with an embodiment of the invention.

Finally, FIG. 4 illustrates an internal view of an example computing device 400, suitable for use as server 20, in accordance with embodiments of the present invention. In an embodiment, computing device 400 includes a storage medium 410 for storing a plurality of programming instructions and a processor 402 for executing the plurality of programming instructions to enable the computing device 400 to generate a recommendation for a venue or an event of interest to be held at a venue proximally located to (or information about) an inferred current location of a user of a portable media player device. The venue or event of interest (or information) may be communicated to the user via communication interfaces 411. In various embodiments, communication interfaces 411 may include network interface cards, modems and so forth. In various embodiments, communication interfaces 411 may be configured to support a wire lined base local area networking protocol, e.g. Ethernet, or wireless communication protocol such as WiFi, GSM, EDGE, 3G.

Element 408 may include various elements such as but not limited to general purpose input/output (I/O) devices, mass storage or other suitable devices to facilitate the generation and transmission of the recommendation or information to the portable media player device. Note that the processor 402, storage medium 410, communication interfaces 411 and other 408 may be coupled to each other via system bus 412, which represents one or more buses. In the case of multiple buses, they are bridged by one or more bus bridges (not shown). In alternate embodiments, other elements may be added, as well as having one or more of the illustrated elements omitted, without departing from the spirit and scope of the present invention.

Thus, it can be seen from the above description, methods and apparatuses for generating by a server, a recommendation for a venue or event of interest proximally located to (or information about) an inferred current location of a user of a portable media player device are described. As a result, a user of a portable media player device has an even more enriched experience from using portable media player device. As mentioned earlier, while the present invention has been described in terms of the above-illustrated embodiments, the present invention is not limited to the embodiments described. The present invention can be practiced with modification and alteration within the spirit and scope of the appended claims. Thus, the description is to be regarded as illustrative instead of restrictive on the present invention.

What is claimed is:

1. A server comprising:
   processor circuitry arranged to:
   infer one or more entertainment preferences of a user of a mobile device based on retrieved information about media accessed by the mobile device and a plurality of media content types of the media, the plurality of media content types including textual media, image media, audio media, and video media;
   access one or more sources of information about venues or events proximal to a current location of the user or the mobile device;
   identify at least one of the venues or events as being of interest to the user based at least in part on the inferred one or more entertainment preferences and the current location;
   generate a recommendation message indicating the identified venue or event; and
   network interface circuitry communicatively coupled to the processor circuitry, the network interface circuitry arranged to receive the information about the media, and send the recommendation message to the mobile device.

2. The server of claim 1, wherein the audio media comprises music media and podcast media.

3. The server of claim 2, wherein the processor circuitry is arranged to generate the recommendation message based at least in part on:
   a genre of music played at the event or venue of interest and a music genre preference of the user inferred by the server based on music media stored in, or accessed using, the mobile device;
   a genre of a play or movie played at the venue or event of interest, respectively, and on a video genre preference of the user inferred by the server based at least in part on video media stored in, or accessed using, the mobile device;
   an exhibit genre of the event or venue of interest and on an image genre preference of the user inferred by the server based on image media stored in, or accessed using, the mobile device; and
   an attribute of a worship, cultural, community or political event or venue of interest and on a subject preference of the user inferred by the server based on podcast media stored in, or accessed using, the mobile device.

4. The server of claim 1, wherein the processor circuitry is further arranged to infer the current location of the user of the mobile device based on obtained location information associated with the mobile device.

5. The server of claim 4, wherein the network interface circuitry is further arranged to:
receive the location information from the mobile device;
receive the location information from a wireless network to which the mobile device has established a network connection.

6. The server of claim 4, wherein the processor circuitry is further arranged to:
determine the current location of the mobile device based on results of triangulation of signals from various wireless access points or based on known current locations of other mobile devices in communication with the server.

7. The server of claim 1, wherein the media accessed by the mobile device is media stored on the mobile device or media streamed to the mobile device.

8. The server of claim 1, wherein the recommendation message is one of a short message service (SMS) message, a multimedia messaging service (MMS) message, a push notification, an email, a pager message, a facsimile message, or a phone call to the mobile device.

9. The server of claim 1, wherein the network interface circuitry is arranged to receive the information about the media from a remote storage system or from the mobile device.

10. A mobile device, comprising:
user interface circuitry;
transceiver circuitry; and
processor circuitry communicatively coupled to the user interface circuitry and the transceiver circuitry, the processor circuitry to:
operate a media player application to access media, and output the accessed media via the user interface circuitry, and
establish a network connection with a server via the transceiver circuitry; and
the transceiver circuitry to receive a recommendation message from the server, the recommendation message indicating an event or venue of interest that is proximate to an inferred current location of a user, and wherein:
the event or venue of interest is based on one or more inferred preferences of the user and the inferred current location,
the inferred preferences are based at least in part on information about the accessed media and media content types of the accessed media from among a plurality of media content types, the plurality of media content types including textual media, image media, audio media, and video media, and
the event or venue of interest is selected from one or more sources of information about a plurality of venues or events proximate to the inferred current location of the user.

11. The mobile device of claim 10, wherein the recommendation is based on one or more of:
a genre of music played at the event or venue of interest and a music genre preference of the user inferred by the server based on audio media stored in, or accessed using, the mobile device;
a theatrical or cinematography genre of the event or venue of interest and on a video genre preference of the user inferred by the server based on video media stored in, or accessed using, the mobile device;
an exhibit genre of the event or venue of interest and on an image genre preference of the user inferred by the server based on image media stored in, or accessed using, the mobile device; and
an attribute of a worship, cultural, community or political event or venue of interest and on a subject preference of the user inferred by the server based on audio media stored in, or accessed using, the mobile device.

12. The mobile device of claim 10, further comprising:
global positioning system (GPS) circuitry to provide data indicative of GPS coordinates of the mobile device,
the processor circuitry is further to generate location information to include the GPS coordinates, and
the transceiver circuitry is to transmit the location information to the server to facilitate the server in inferring a current location of a user of the mobile device.

13. The mobile device of claim 10, wherein:
user interface circuitry is to obtain a user input indicating a current location of the mobile device or a desired location of the mobile device,
the processor circuitry is further to generate location information to indicate the user input, and
the transceiver circuitry is to transmit the location information to the server to facilitate the server in inferring a current location of a user of the mobile device.

14. The mobile device of claim 10, wherein the current location is further inferred based on a location of an access network node through which the mobile device has established a network connection or based on one or more previous geographic locations of the mobile device.

15. The mobile device of claim 10, wherein the recommendation message is one of eta short message service (SMS) message, a multimedia messaging service (MMS) message, a push notification, an email, a pager message, a facsimile message, or a phone call.

16. The mobile device of claim 10, wherein the mobile device is a cellular phone, a portable media player, a tablet computer, or an in-vehicle computing device.

17. A method of operating a mobile device, the method comprising:
executing a media player application to access media stored in memory of the mobile device or streamed to the mobile device;
establishing a network connection with a server; and
receiving a recommendation message from the server, the recommendation message indicating an event or venue of interest that is proximate to an inferred current location of a user of the mobile device,
the event or venue of interest is based on one or more inferred preferences of the user and the inferred current location,
the inferred preferences are based at least in part on information about the accessed media and media content types of the accessed media from among a plurality of media content types, the plurality of media content types including textual media, image media, audio media, and video media, and
the event or venue of interest is selected from one or more sources of information about a plurality of venues or events proximate to the inferred current location of the user.

18. The method of claim 17, further comprising:
generating a location information message to indicate a location of the mobile device; and
transmitting the location information to the server to facilitate the server in inferring a current location of a user of the mobile device.

19. The method of claim 17, further comprising:
  determining the location of the mobile device based on global positioning system (GPS) coordinates of the mobile device or an obtained user input indicating a current location of the mobile device or a desired location of the mobile device.

20. The mobile device of claim 17, wherein the current location is further inferred based on a location of a wireless network to which the mobile device has established a network session and based on one or more previous geographic locations of the mobile device.

\* \* \* \* \*

UNITED STATES PATENT AND TRADEMARK OFFICE
CERTIFICATE OF CORRECTION

| | | |
|---|---|---|
| PATENT NO. | : 10,959,040 B2 | Page 1 of 1 |
| APPLICATION NO. | : 16/275089 | |
| DATED | : March 23, 2021 | |
| INVENTOR(S) | : Evan Feldman et al. | |

It is certified that error appears in the above-identified patent and that said Letters Patent is hereby corrected as shown below:

In the Claims

Column 10
Line 31, "...eta..." should read – "...a..."

Signed and Sealed this
First Day of June, 2021

Drew Hirshfeld
*Performing the Functions and Duties of the*
*Under Secretary of Commerce for Intellectual Property and*
*Director of the United States Patent and Trademark Office*